United States Patent

[11] 3,523,553

| [72] | Inventors | Leonard R. Beck<br>Rolling Meadows, Illinois;<br>Richard N. Wilke, Addison, Illinois |
|---|---|---|
| [21] | Appl. No. | 748,860 |
| [22] | Filed | July 30, 1968 |
| [45] | Patented | Aug. 11, 1970 |
| [73] | Assignee | Martin Tool Works, Inc.<br>Rolling Meadows, Illinois<br>a Corp. of Illinois |

[54] MOTOR OPERATED FLUID VALVE
4 Claims, 2 Drawing Figs.

[52] U.S. Cl. .................................................... 137/596.14,
137/625.6, 625.38; 251/344
[51] Int. Cl. .................................................... F16k 11/10
[50] Field of Search .......................................... 251/343,
344; 137/625.25, 625.26, 625.27, 625.33, 625.38,
625.39, 625.6, 625.66, 625.68, 221, 222

[56] References Cited
UNITED STATES PATENTS

| 2,278,313 | 3/1942 | Hornbostel | 251/344 |
| 2,379,079 | 6/1945 | Hayward | 251/344 |
| 3,217,745 | 11/1965 | Tate | 137/625.68 |
| 3,227,179 | 1/1966 | Rosaen | 137/625.26 |

*Primary Examiner*— Henry T. Klinksiek
*Attorney*—Darbo, Robertson and Vandenburgh ABSTRACT: An in-the-line fluid valve is defined by a cylinder, a portion of which is annular, and an annular piston means in the cylinder. The inner wall of the annular portion is formed by a core which has an axial passageway connected to a fluid source and radial openings at the distal end thereof. The piston means has two ends connected by a web which spans the radial openings. The piston means is movable along the core between a first position at which it blocks fluid flow from the source passage to the other end of the cylinder, and a second position at which fluid can flow from the radial openings through the cylinder to the other end thereof at which end there is a connection for a hydraulic cylinder. In the first position the hydraulic cylinder connection communicates through the cylinder to exhaust ports. Air is introduced into the cylinder at the proximal end of the core to drive the piston means from the first to the second position.

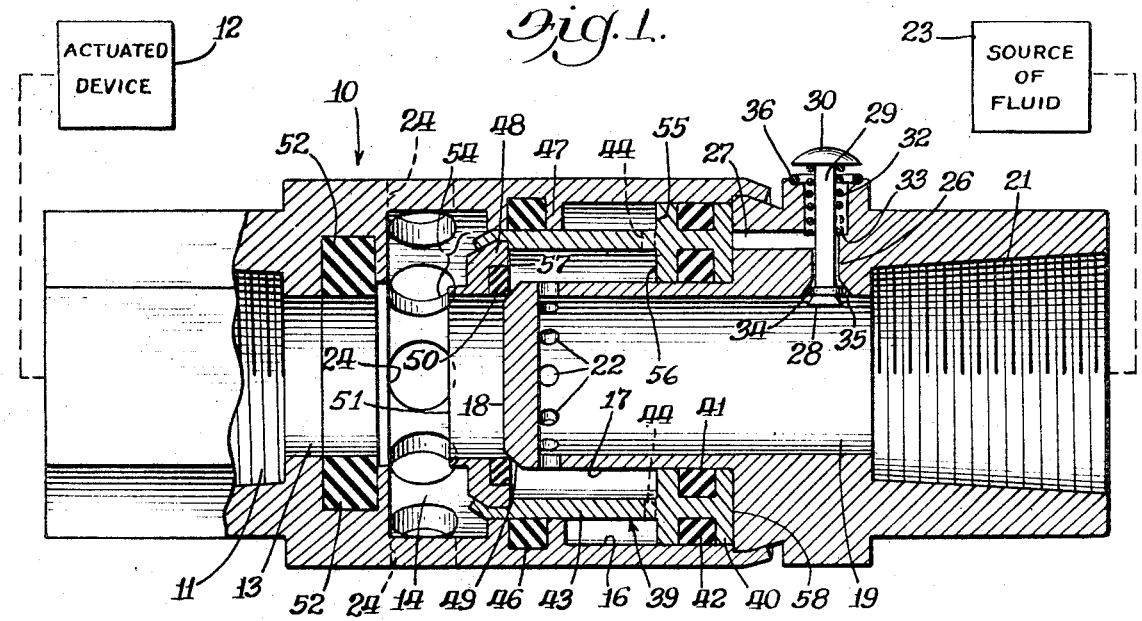
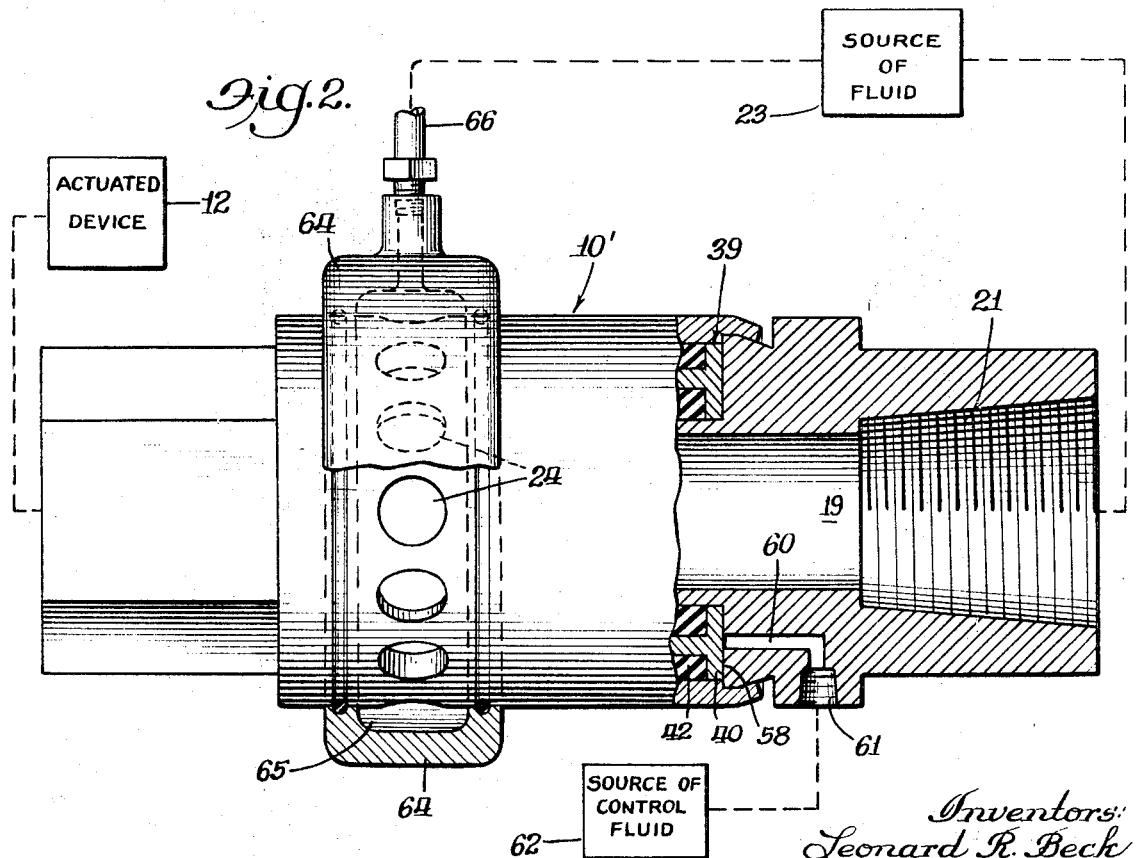

MOTOR OPERATED FLUID VALVE

BACKGROUND OF THE INVENTION

Commercially available valves for operating hydraulic cylinders or the like are generally large, cumbersome and expensive. The present invention relates to a comparatively small and inexpensive, full flow, fluid valve for operating hydraulic cylinders or the like. It is particularly adapted for in-the-line operation where it can be mounted close to the hydraulic cylinder. For air operated cylinders, for example, this provides a very substantial saving in the matter of air wasted. It is simple and positive in operation. It can be operated either by a mechanical operator or by fluid from a control source.

SUMMARY OF THE INVENTION

The present invention relates to a simple and inexpensive fluid control valve particularly for use in operating air or hydraulic cylinders by either mechanical actuation or by actuation from a source of control fluid.

DESCRIPTION OF THE DRAWINGS

FIGURE 1 is an elevational view, mainly broken away, of an embodiment of the invention; and FIGURE 2 is an elevational view, partially broken away, illustrating alternative arrangements.

DESCRIPTION OF THE SPECIFIC EMBODIMENTS

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

The embodiment illustrated in FIGURE 1 comprises a valve body or casing generally 10. The two ends are hexagonal so that they may be readily gripped with wrenches. At one end is a pipe connection 11 adapted to be connected to a device 12 to be actuated, such as an air operated, single acting, cylinder. Connection 11 communicates with a passage 13. Within casing 10 there is an internal opening 14, the left end of which (as viewed in FIGURE 1) is cylindrical and the right end is annular. The external face of the annular portion is defined by internal walls 16 of casing 10, and the inner face thereof is defined by external wall 17 of a core 18 forming a part of the valve body.

Core 18 has an internal passage 19. Passage 19 communicates with a connection 21. A portion of passage 19 is formed by openings 22 extending radially through wall 17 of the core. Connection 19 is for connecting the valve to a source of fluid 23 for operating device 12. Exhaust ports 24 extend radially through wall 16 in the area of the cylindrical portion of chamber 14.

A control fluid passage is formed by radial opening 26 and axially aligned opening 27 extending between passage 19 and internal chamber 14 at the proximal end of the core. Within opening 26 is an actuating valve comprising a valve head 28, a stem 29, and an external button 30. A spring 32 is in compression between button 30 and an abutment 33 in opening 26. An O-ring seal 34 encircles stem 29 in a position to seal against the truncated conical face 35 at the end of radial opening 26. An O-ring seal 36 is supported in body 10 in a position to bear against button 30 when the button is moved inwardly against the valve body.

Within the valve body is a piston means generally 39. It has an enlarged annular head 40 at one end. Head 40 carries an O-ring seal 41, which is in sealing contact with wall 17, and an O-ring seal 42, which is in contact with wall 16. An annular web 43 connects to head 40. It has radial openings 44 therethrough.

Web 43 is in sealing contact with an O-ring 46 held in an inwardly extending annular boss 47 of casing 10. At the other end of the piston means there is a smaller annular head 48 having a soft seal 50 secured thereto. In the illustrated position, the seal of head 48 is in sealing contact with the truncated conical face 49 on the distal end of core 18. Head 48 has an annular outstanding flange 51. When the piston means 49 is in its alternate position (to the left in FIGURE 1) flange 51 bears against an annular seal 52 held in body 10.

It will be seen that the piston means 39 has two sets of faces oriented in opposite directions. One set of faces is composed of the aggregate area 54 on one side of end 48 of the piston means and faces 55 and 56 of end 40. The oppositely oriented set of faces is composed of face 57 of end 48 and face 58 of end 40. The configuration is such that the aggregate area of faces 54, 55, 56 is less than the aggregate area of faces 57, 58.

Assuming that the valve is connected to a single acting air cylinder 12 and to a source 23 of air under pressure, the piston means 39 will normally be in the position illustrated in FIGURE 1. In this position the end 48 of piston means 39 is sealingly seated against the distal end of core 18. The air cylinder 12 is connected to exhaust through passage 13 and exhaust ports 24. If it is now desired to actuate the air cylinder 12 by applying air pressure thereto, button 30 is depressed against seal 36. This admits air through the control passage 26, 27 and applies it to the portion of chamber 14, to which portion face 58 of the piston means is exposed. Because of the greater area of faces 57, 58, the air pressure now drives the piston means 39 to the left so that flange 51 seats against seal 52. The air from source 23 is now free to flow through passage 19, including openings 22, into chamber 14 and through the central opening in head 48 into passage 13 leading to air cylinder 12. The seating of flange 51 in seal 52 and the presence of seal 46 about the exterior of web 43 blocks the communication of this high pressure air from exhaust ports 24.

When air cylinder 12 is to be deactivated, button 30 is released closing off the control passage 26, 27 from passage 19 and at the same time opening it to atmosphere at the exterior of the valve body 10. This removes the air pressure from face 58 of the piston means. Since faces 55, 56 have a larger area than face 57, the air pressure within chamber 14 will drive the piston means back to the position illustrated in FIGURE 1.

FIGURE 2 illustrates an alternative embodiment in which the valve body 10' corresponds to the valve body 10 of FIGURE 1 except that the control fluid passage 60 leads to an external connection 61 to provide a fluid communication to a source of control fluid 62. This, for example might be a fluid amplifier to make the valve responsive to very low pressure sensors of the fluid type. These by well known fluid amplification could apply fluid under pressure at control passage 60 to actuate the valve in the same manner as described in connection with the FIGURE 1 embodiment.

FIGURE 2 also illustrates a second variation in the form of a manifold 64 surrounding openings 24 to trap the fluid, escaping from openings 24, in a chamber 65 of the manifold from which chamber the fluid can be returned through a hose or pipe 66 to source 23. Thus, for example, in FIGURE 2 the actuated device 12 might be a hydraulic cylinder and source 23 an oil reservoir and pump, the pump being connected to connection 21 and the reservoir to pipe 66. Thus there would be no loss of hydraulic fluid as the valve was operated.

To operate a double acting cylinder, two of the valves described would have their connections 21 going to a T, the third end of which was connected to source 23. The end connections 11 of the two valves would go to the two ends of a double acting cylinder. This has the advantage that the two ends 11 could be placed immediately adjacent the ends of the operating cylinder so that there would be little fluid returned out ports 24 with the actuation of the valves. As a matter of fact, the valve body or casing 10 could be an integral part of the fluid cylinder with the chamber 14 merely being a drilled opening in the cylinder ends.

We claim:

1. A fluid control valve adapted to be connected to a fluid source and to a fluid utilization device, said valve comprising:

a casing defining a cylinder at least a portion of which is annular and piston means movably received in said cylinder, said piston means having two ends and an annular web connecting said ends, said piston means defining first pressure faces exposed on one side and second pressure faces exposed on the other side, said first pressure faces having an area that is larger than the area of the second pressure faces, said casing defining fluid source passage means, fluid device passage means, an exhaust port means and control passage means communicating with said cylinder at respective, spaced portions therein, said piston means being movable in said cylinder between two positions, at one of said positions said device passage means being in communication with said port means and cut off from said source passage means and at the other of said positions said device passage means communicating with said source passage means and cut off from said port means, said control passage means communicating with a portion of the cylinder such that the fluid supplied through the control passage means will be applied only at least a part of said first pressure faces, said source passage means communicating with a portion of the cylinder such that the fluid supplied through the source passage means will be simultaneously applied to at least a part of both the first and the second pressure faces, whereby with fluid applied to both the control passage means and the source passage means the piston means will be urged in one direction in the cylinder.

2. A fluid control valve for the on-off application of fluid from fluid source means to a utilization device such as a hydraulic cylinder or the like said valve including:

a casing having cylindrical walls formed about an axis and a coaxial cylindrical core within said walls, said walls and core defining a chamber therebetween having two ends, said casing defining:

a device connection and passage communicating with one end of said chamber, a source connection and passage communicating with said chamber intermediate the ends of the chamber, an annulus extending inwardly intermediate the ends of the chamber, a control fluid passage at the other end of the chamber, and an exhaust port communicating with the chamber at a point between said one end and the annulus; and piston means in said chamber in sealing contact with said walls, said annulus and said core, said piston means being movable between a first position at which fluid communication between said device passage and said source passage is blocked and said device passage is in fluid communication with said port and a second position at which said device passage is in fluid communication with said source passage and fluid communication between said device passage and said port is blocked, said piston blocking fluid communication between said source passage and said port when in both of said two positions, said piston having one end corresponding to said one end of the chamber and another end corresponding to said other end of the chamber, said other end of the piston having a greater area than that of said one end thereof.

3. A valve as set forth in Claim 2, wherein said source passage extends from the exterior of said casing, through a portion of said core in an axial direction, and then through said core in a radial direction into a portion of said cylinder, said piston means having an annular web between said two ends and having opposed, exposed faces in the chamber at the sides of the two ends at which the web is connected, said web having an opening therethrough in a radial direction, the last referred to portion of said cylinder being the portion partially occupied by said web whereby fluid from said source is simultaneously applied to said opposed, exposed faces.

4. A valve as set forth in Claim 3, wherein said core has a proximal end secured to the casing at said other end of the chamber and a distal end spaced from the casing at said one end of the chamber, said other end of the piston means contacting both said walls and said core, said web opening being adjacent said other end of the piston means, said one end of the piston means being annular and smaller than said other end thereof and contacting said distal end when said piston means is in said one position and contacting said casing about the device passage when said piston means is in said other position.